(12) United States Patent
Waisbard et al.

(10) Patent No.: US 12,058,144 B2
(45) Date of Patent: Aug. 6, 2024

(54) METHOD AND APPARATUS FOR PROTECTING INTEGRITY OF DIGITAL INFORMATION

(71) Applicant: Nokia Technologies Oy, Espoo (FI)

(72) Inventors: Erez Waisbard, Ramat Gan (IL); Louis M. Shekhtman, Yitzhar (IL)

(73) Assignee: NOKIA TECHNOLOGIES OY, Espoo (FI)

( * ) Notice: Subject to any disclaimer, the term of this patent is extended or adjusted under 35 U.S.C. 154(b) by 438 days.

(21) Appl. No.: 17/429,710

(22) PCT Filed: Feb. 12, 2019

(86) PCT No.: PCT/FI2019/050112
§ 371 (c)(1),
(2) Date: Aug. 10, 2021

(87) PCT Pub. No.: WO2020/165486
PCT Pub. Date: Aug. 20, 2020

(65) Prior Publication Data
US 2022/0131874 A1    Apr. 28, 2022

(51) Int. Cl.
*H04L 9/00* (2022.01)
*H04L 9/32* (2006.01)
*H04L 9/40* (2022.01)

(52) U.S. Cl.
CPC .......... *H04L 63/123* (2013.01); *H04L 9/3239* (2013.01); *H04L 9/50* (2022.05); *H04L 2463/121* (2013.01)

(58) Field of Classification Search
CPC ... H04L 9/3236; H04L 9/3239; H04L 9/3242; H04L 9/3247; H04L 9/50; H04L 63/123; H04L 2463/121; G06F 21/64; G06F 21/645
See application file for complete search history.

(56) References Cited

U.S. PATENT DOCUMENTS

| | | | |
|---|---|---|---|
| 5,136,646 A | 8/1992 | Haber et al. | |
| 5,978,475 A | 11/1999 | Schneier et al. | |
| 9,864,878 B2 | 1/2018 | Sofia et al. | |
| 11,205,102 B1 * | 12/2021 | O'Connell | G06F 21/645 |

(Continued)

FOREIGN PATENT DOCUMENTS

| | | |
|---|---|---|
| EP | 1243999 A2 | 9/2002 |
| EP | 2019992 B1 | 9/2015 |
| WO | 2008/010006 A1 | 1/2008 |

OTHER PUBLICATIONS

Bellare et al., "Forward integrity for secure audit logs", Technical report, Computer Science and Engineering Department, Citeseer, vol. 184, Nov. 23, 1997, pp. 1-16.
Möller et al., "A polymer/semiconductor write once read-many-times memory", Nature, vol. 426, Nov. 13, 2003, pp. 166-169.
Dwork et al., "Pricing via Processing or Combatting Junk Mail", Advances in Cryptology—CRYPTO '92, 1993, pp. 139-147.
Schneier et al., "Cryptographic Support for Secure Logs on Untrusted Machines", Proceedings of the 7th conference on USENIX Security Symposium, vol. 7, Jan. 1998, 10 pages.

(Continued)

*Primary Examiner* — Minh Dinh
(74) *Attorney, Agent, or Firm* — ALSTON & BIRD LLP

(57) ABSTRACT

A method and apparatus for integrity protecting data that include and perform: receiving as input data any new digital information from one or more sources; forming a protection block representing the input data received during a first period of time, if any; forming a digital descriptor using at least the protection block; and producing a delay-coding verification code based on the digital descriptor and a previous verification code.

20 Claims, 3 Drawing Sheets

(56) References Cited

U.S. PATENT DOCUMENTS

| | | |
|---|---|---|
| 2003/0236992 A1 | 12/2003 | Yami |
| 2005/0166263 A1 | 7/2005 | Nanopoulos et al. |
| 2009/0016534 A1* | 1/2009 | Ortiz Cornet ............ G06F 21/64 380/277 |
| 2009/0199301 A1 | 8/2009 | Chandrasekaran et al. |
| 2009/0238365 A1 | 9/2009 | Bardera Bosch et al. |
| 2010/0115284 A1 | 5/2010 | Hahn et al. |
| 2010/0218002 A1* | 8/2010 | Graziani ............... H04L 9/3242 711/E12.092 |
| 2016/0171205 A1* | 6/2016 | Bauer .................... G06F 9/542 726/26 |
| 2018/0337772 A1* | 11/2018 | Acar ..................... H04L 63/123 |
| 2020/0059363 A1* | 2/2020 | Lobo ..................... H04W 12/77 |
| 2021/0075623 A1* | 3/2021 | Petersen .............. H04L 9/3242 |

OTHER PUBLICATIONS

Shekhtman et al., "Securing Log Files through Blockchain Technology", Proceedings of the 11th ACM International Systems and Storage Conference, Jun. 2018, 1 page.

International Search Report and Written Opinion received for corresponding Patent Cooperation Treaty Application No. PCT/FI2019/050112, dated Jul. 5, 2019, 14 pages.

International Preliminary Report on Patentability II received for corresponding Patent Cooperation Treaty Application No. PCT/FI2019/050112, dated Dec. 16, 2020, 10 pages.

Extended European Search Report received for corresponding European Patent Application No. 19914704.2, dated Aug. 19, 2022, 6 pages.

* cited by examiner

METHOD AND APPARATUS FOR PROTECTING INTEGRITY OF DIGITAL INFORMATION

RELATED APPLICATION

This application was originally filed as PCT Application No. PCT/FI2019/050112, filed on Feb. 12, 2019, of which is incorporated herein by reference in its entirety.

TECHNICAL FIELD

Various example embodiments relate to protecting integrity of digital information.

BACKGROUND

This section illustrates useful background information without admission of any technique described herein representative of the state of the art.

Digital information is freely changeable. There are numerous needs to protect digital information against subsequent tampering. For instance, with digital currencies, proof of transactions is typically produced using blockchain technology in which digital information is shared among many in a peer network and it is assumed that a majority of participants are trustworthy. The minority may yet attempt to represent itself as a majority and this is why a Proof of Work, PoW, is needed.

With digital currencies, a proof of work is performed so that many parties perform time-consuming computation that verifies a chain of data blocks to be true such that no block in the chain could be tampered. Inherently, same cryptographic functions are run by all the computers or cloud computing processes participating in the blockchain operations. Some cryptocurrencies also award participants for producing initial cryptocurrency units to be used so that there is a great interest and need to produced application specific circuits, ASICs, specifically designed to greatly accelerate these functions. It is also inherent that the underlying cryptographic functions must remain usable also in the future in order to enable the use of earlier created cryptocurrency funds.

Blockchain is by its nature well-suited to protecting gradually accruing digital information as new items of information can be treated as the blocks of the blockchain. However, blockchains that use PoW are rather energy inefficient in that it has to run with present computers functions that are estimated to be sufficiently time consuming with future computer generations and the protected data are also exposed to outsiders when using the typical peer-to-peer networks.

It is also possible to simply encrypt or digitally sign information. A digital signature is a relatively simple and fast operation in with a concise derivative of one or more blocks is formed and this derivative is then digitally signed such that it is subsequently possible to verify that the signature matches its source data. This approach is yet problematic, e.g., in case of computer security logs that are intended to be used for analyzing whether a breach of a system has occurred and the current status of the system. However, if a system has been taken over, then a malicious party may also control the encryption so that security logs can be overwritten with respectively modified signatures.

Special write once read many memories also exist and suit to storing integrity protection data, but they require special hardware and by design have limited capacity as the storage space is not reusable. It is also possible to print and archive logs or derivatives as paper hardcopies such that a digital intruder not physically present at premises could not tamper with the stored data. However this comes at the expense of manual work and lacking computerized searching capability.

SUMMARY

Various aspects of examples of the invention are set out in the claims.

According to a first example aspect of the present invention, there is provided a method for integrity protecting data, comprising:

receiving as input data any new digital information from one or more sources;

forming a protection block representing the input data received during a first period of time, if any;

forming a digital descriptor using at least the protection block; and producing a delay-coding verification code based on the digital descriptor and a previous verification code.

The input data may comprise a gradually growing file. The gradually growing file may be a log file. The gradually growing file may comprise diagnostic data of a digital data processing or storing entity. The computing entity may comprise or be a processor. The computing entity may comprise or be a data storage such as a hard drive. The computing entity may comprise or be a server computer.

The forming of the protection block may comprise combining data received from one or more sources during the first period of time into a single data unit. The combining may be concatenation. Alternatively, the combining may comprise modifying data received from one source by data received from another source. The modifying may comprise using a fusion function or an additive cipher function. The additive cipher function may comprise or be XOR joining.

The digital descriptor may be formed using the protection block and a time stamp. The forming of the digital descriptor may comprise using one or more other digital descriptors. The forming of the digital descriptor may comprise using one or more other protection blocks representing other periods of time.

The digital descriptor may be or comprise a message digest. The digital descriptor may be or comprise a checksum of at least N bits. N may be 16, 32, 64, 128, 256 or 512.

The delay-coding verification code may be formed using a memory-bound function.

The delay-coding verification code may be formed using a first function for a first protection block and using a second function for a second block. The functions used in the delay-coding verification may be published or kept confidential.

An indication of the function applied in forming the delay-coding verification code may be combined with the delay-coding verification code. The indication may reveal the function applied. Alternatively, the indication may be conceal the function applied.

An indication of the function applied in forming the delay-coding verification code may be stored into an indication storage. The indication may reveal the function applied. Alternatively, the indication may conceal the function applied. The indication storage may comprise a digital indication storage. The indication storage may comprise a hardcopy based indication storage, such as using paper prints.

According to a second example aspect of the present invention, there is provided an apparatus for integrity protecting data, comprising:
  a communication function configured to receive as input data any new digital information from one or more sources;
  a processing function configured to:
  form a protection block representing the input data received during a first period of time, if any;
  form a digital descriptor using at least the protection block; and
  produce a delay-coding verification code based on the digital descriptor and a previous verification code.

The communication function may comprise an input port. The input port may comprise an electric data transfer port. The input port may comprise a serial input port. The input port may comprise a parallel port. The input port may comprise an optical data transfer port. The optical data transfer port may be a multicarrier port. The optical data transfer port may be a single carrier port.

The processing function may comprise one or more processors. The processing function may comprise one or more virtualized processors. The processing function may comprise a cloud computing implemented virtual processor.

According to a third example aspect of the present invention, there is provided a computer program comprising computer executable program code configured to execute any method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fourth example aspect of the present invention, there is provided an apparatus comprising at least one memory and at least one processor that are configured to cause the apparatus to perform the method of the first example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
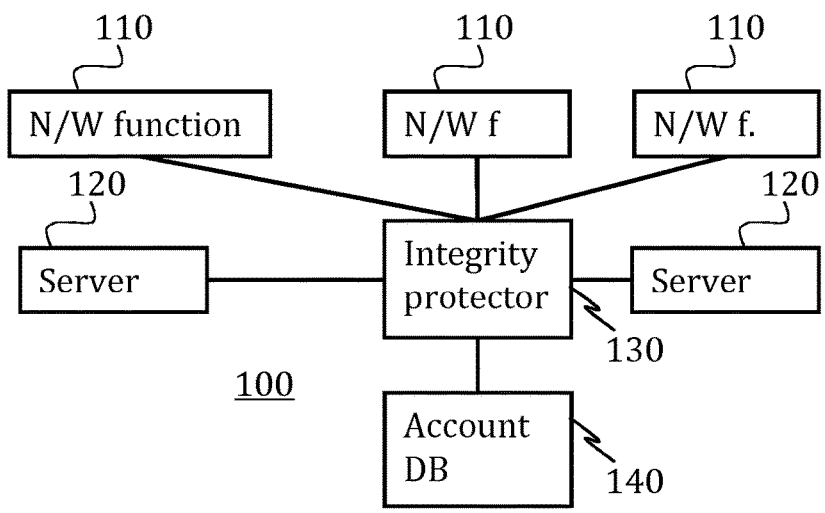
FIG. 1 shows an architectural drawing of a system of an example embodiment.

FIG. 1 shows an architectural drawing of a system 100 of an example embodiment. In FIG. 1, there are some network functions NF 110, servers 120, an integrity protector 130 and an account database 140. Any of these example elements may be combined or distributed according to implementation, either entirely or in part (e.g., portions of the network function 110 could be combined with the server 120 or the integrity protector 130). Any of these elements may be implemented using hardware, virtualized function, or both.

In an example embodiment, some of the elements of FIG. 1 produce log files or other information. Some of the information is produced as discrete files, such as configuration logs or last good startup configuration files. Some of the information is produced as gradually growing files or databases, such as use logs, security logs, user account data or financial account data. In an example embodiment, the integrity protector 130 treats all new information that it receives (e.g., through a port or by gaining access through to data stored in databases and/or memories) during a first period of time as a protection block that is to be integrity protected against tampering.

Figure 2:
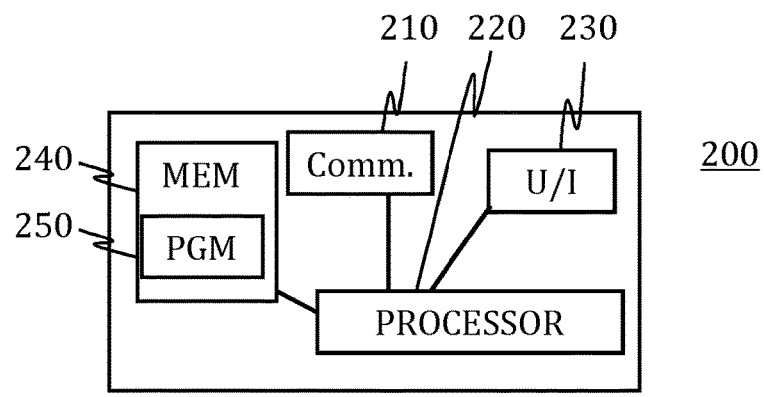
FIG. 2 shows a flow chart of a process of an example embodiment.

FIG. 2 an apparatus 200 according to an embodiment of the invention. The apparatus 200 comprises a memory 240 including computer program code 250. The apparatus 200 further comprises a processor 220 for controlling the operation of the apparatus 200 using the computer program code 240, a communication unit 210 for communicating with other nodes and with the cryptocurrency network. The communication unit 210 comprises, for example, a local area network (LAN) port; a wireless local area network (WLAN) unit; Bluetooth unit; cellular data communication unit; or satellite data communication unit. The processor 220 comprises, for example, any one or more of: a master control unit (MCU); a microprocessor; a digital signal processor (DSP); an application specific integrated circuit (ASIC); a field programmable gate array; and a microcontroller. In an example embodiment, the apparatus 200 further comprises a user interface 230.

Figure 3:
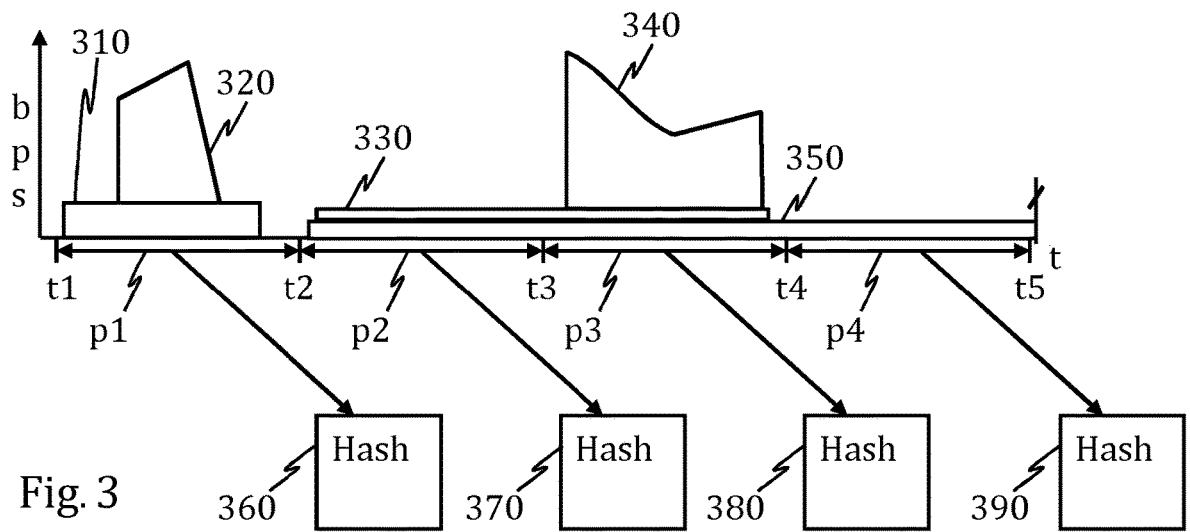
FIG. 3 shows a time chart of an example embodiment.

FIG. 3 shows a time chart of an example embodiment. FIG. 3 shows how the integrity protector 130 receives a first file 310, a second file 320, a third file 330, a fourth file 340 and a stream 350. Any and all of these received data items may vary in their data rate as exemplified by drawing a non-regular shape for the second and fourth files 320, 340.

As seen from FIG. 3, data received during successive first to fourth time periods p1 to p4 is in this embodiment treated as protection blocks for which digital descriptors, here respective first to fourth hash results 360 to 390, are obtained.

In FIG. 3, some data is received during each period of time. However, there need not be any data received during all time periods so some protection blocks may be empty except that there would still in some embodiments be some data that comprises any one or more items selected from a list consisting of: a time stamp; a sequence number; one or more identifiers; function description data; random replay attack protection data; one or more network addresses; one or more portions of any one of the preceding items.

FIG. 3 shows by an arrow that data received during a given period of time is used in hashing or, more generally, for producing a respective digital descriptor. As mentioned in the foregoing, the digital descriptor is formed using data of one or more data files or streams received during that period but not only using those files or streams, or more generally the protection block, but also other data may be included in the forming of the digital descriptor.

In an example embodiment, the digital descriptor is formed using a plurality of protection blocks. For example, the digital descriptor can be formed using most recent N protection blocks, or using first M and most recent N protection blocks, or N protection blocks backwards from the most recent ones with a skipping scheme in which after each sequence of O protection blocks, P protection blocks are skipped.

In FIG. 3, the stream 350 and the third file 330 span to at least two time periods. Boundaries of file segments can be indicated using, for example, suitable metadata, embedding a delimiter token. In an example embodiment, a protection block description is produced, e.g., to define which files are contained in the protection block and optionally also by which portions. In an example embodiment, the protection block description is an extensive markup language XML description.

The protection block may not as such be maintained after use for computing the digital descriptor. However, the protection block description may be maintained for simplifying subsequent verification that the digital descriptors formed match their source data. The protection block can also be formed combining data from various sources in various ways. For example, in an example embodiment, the data from different sources are concatenated, optionally with some delimiting codes. In another example embodiment, the data can be combined using an additive cipher function such as XOR joining.

The purpose of the digital descriptors is to enable verifying the integrity of source data. It can be checked that the computation of the digital descriptor again with its presumed source data produces a matching result.

In FIG. 3, the protection blocks were formed of equally long periods of time. In an example embodiment, the duration of the time periods is variable. For example, the duration can be varied depending on any one or more of: processing load of equipment producing the digital descriptor and/or the delay-coding verification code; amount of source data received; and a random parameter.

Figure 4A:
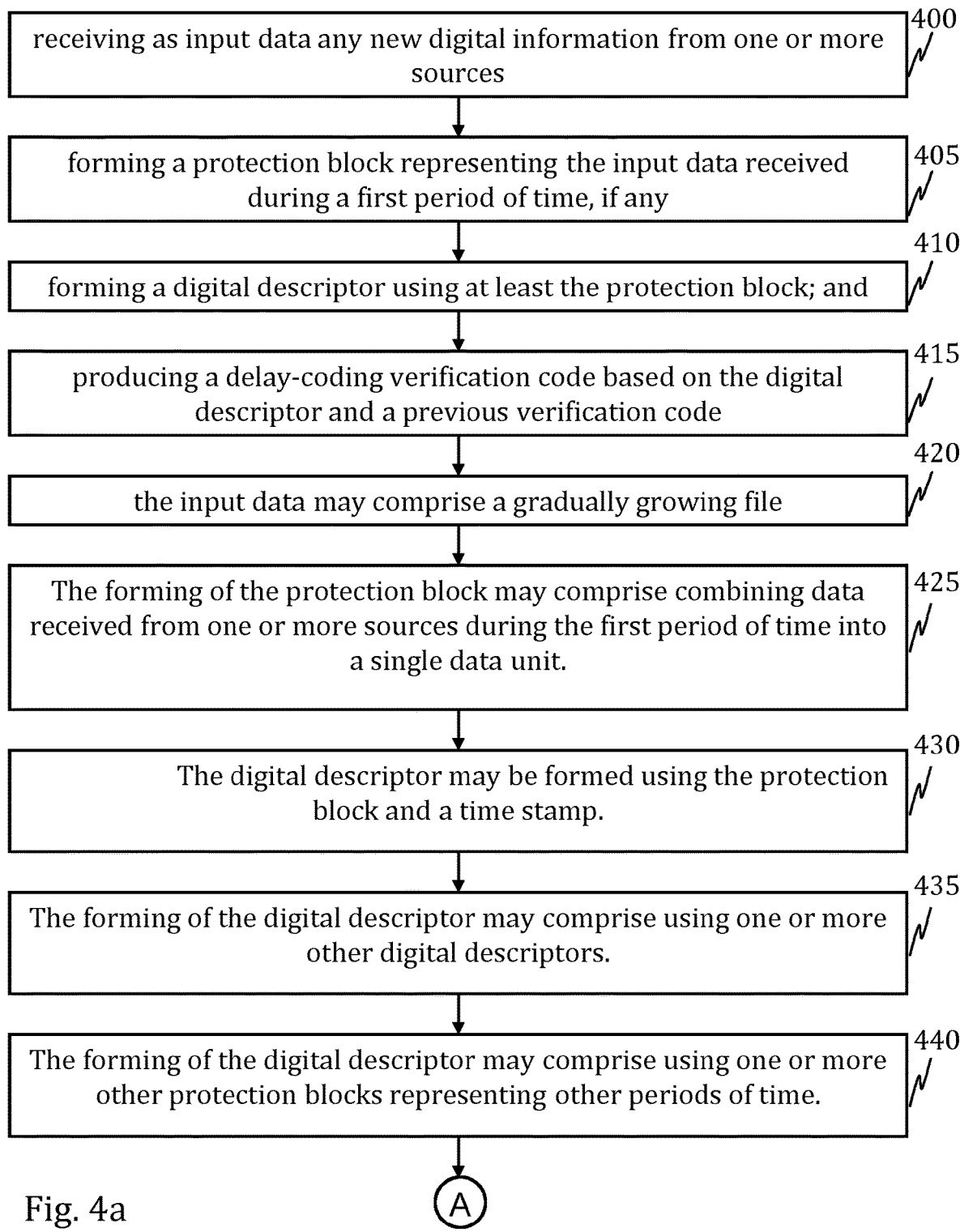
FIGS. 4a and 4b show a flow chart of various steps of some example embodiments.
Figure 4B:
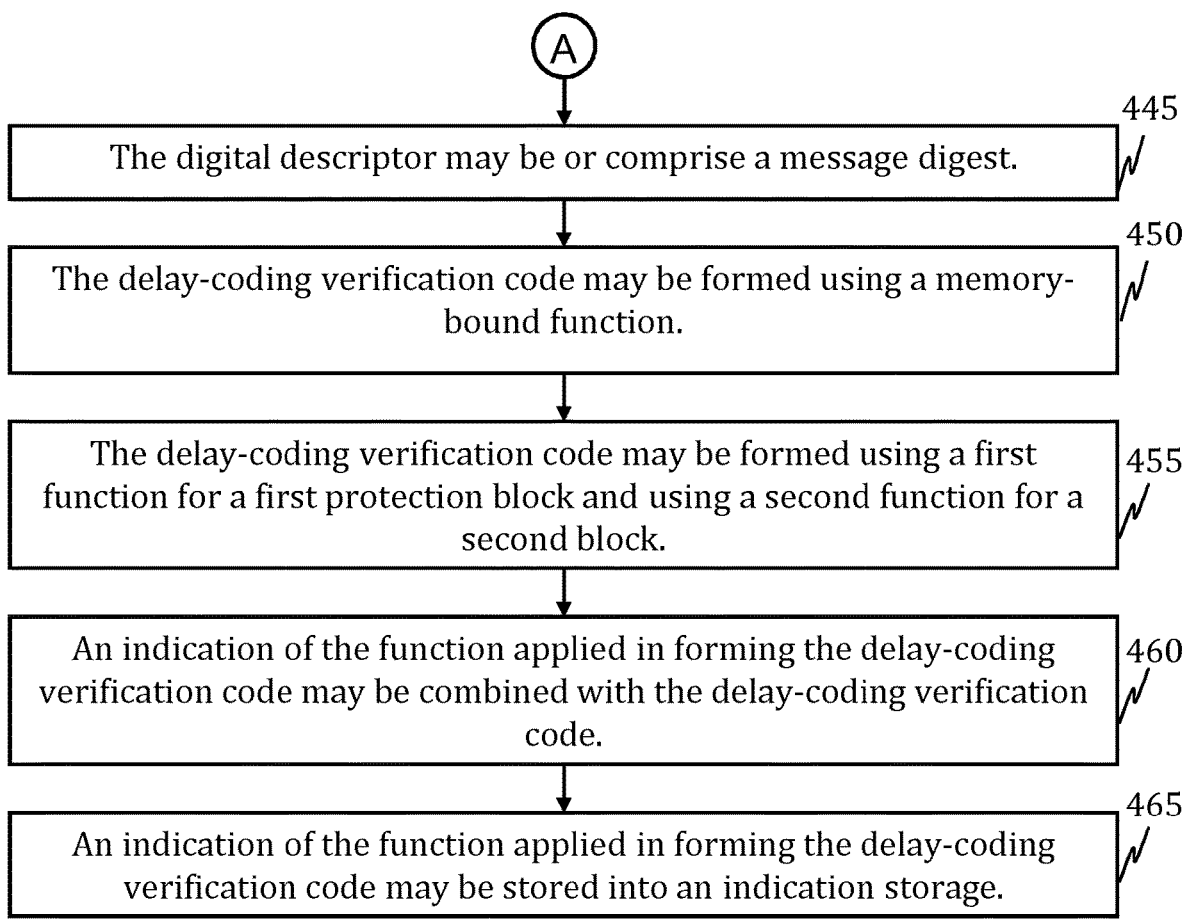

FIGS. 4a and 4b show a flow chart of various steps of some example embodiments for integrity protecting data, comprising:
- 400. receiving as input data any new digital information from one or more sources;
- 405. forming a protection block representing the input data received during a first period of time, if any;
- 410. forming a digital descriptor using at least the protection block; and
- 415. producing a delay-coding verification code based on the digital descriptor and a previous verification code.
- 420. The input data may comprise a gradually growing file.
- 425. The forming of the protection block may comprise combining data received from one or more sources during the first period of time into a single data unit.
- 430. The digital descriptor may be formed using the protection block and a time stamp.
- 435. The forming of the digital descriptor may comprise using one or more other digital descriptors.
- 440. The forming of the digital descriptor may comprise using one or more other protection blocks representing other periods of time.
- 445. The digital descriptor may be or comprise a message digest.
- 450. The delay-coding verification code may be formed using a memory-bound function.
- 455. The delay-coding verification code may be formed using a first function for a first protection block and using a second function for a second block.
- 460. An indication of the function applied in forming the delay-coding verification code may be combined with the delay-coding verification code.
- 465. An indication of the function applied in forming the delay-coding verification code may be stored into an indication storage.

The delay-coding may involve applying one or more encryption function. The one or more encryption functions may comprise a symmetric encryption function such as the advanced encryption standard. The one or more encryption functions may comprise an asymmetric encryption function such as the Rivest-Shamir-Adleman, RSA.

Without in any way limiting the scope, interpretation, or application of the claims appearing below, a technical effect of one or more of the example embodiments disclosed herein is that data received from multiple sources at variable rates can be integrity protected with predictable computation cost. Another technical effect of one or more of the example embodiments disclosed herein is that the functions used in producing the digital descriptor and the delay-coding verification code can be freely changed during integrity protecting data. Yet another technical effect of one or more of the example embodiments disclosed herein is that the functions used and/or the amount of data (indirectly through the digital descriptor) subjected to the delay-coding verification can be varied such that varying amounts of source data and computation capacity can be accounted for.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
at least one processor; and at least one memory including computer program code, the at least one memory and the computer program code configured to, with the at least one processor, cause the apparatus to perform at least the following:
receive as input data any new digital information from one or more sources;
form a protection block representing the input data received during a first period of time, if any;
form a digital descriptor using a plurality of protection blocks comprising at least the protection block, wherein respective ones of the plurality of protection blocks represent different periods of time; and
produce a delay-coding verification code based on the digital descriptor and a previous verification code.

2. The apparatus of claim 1, wherein the input data comprises a gradually growing file.

3. The apparatus of claim 1, wherein the memory and computer program code are further configured to, with the processor, cause the apparatus to form the protection block by combining data received from one or more sources during the first period of time into a single data unit.

4. The apparatus of claim 1, wherein the digital descriptor is formed using the protection block and a time stamp.

5. The apparatus of claim 1, wherein the forming of the digital descriptor comprises using one or more other digital descriptors.

6. The apparatus of claim 1, wherein the digital descriptor comprises a message digest.

7. The apparatus of claim 1, wherein the delay-coding verification code is formed using a memory-bound function.

8. The apparatus of claim 1, wherein the delay-coding verification code is formed using a first function for a first protection block and using a second function for a second block.

9. The apparatus of claim 1, wherein an indication of the function applied in forming the delay-coding verification code is combined with the delay-coding verification code.

10. The apparatus of claim 1, wherein a selection of the plurality of protection blocks is used to form the digital descriptor, and wherein the selection is determined using a number of most recent protection blocks.

11. The apparatus of claim 1, wherein a selection of the plurality of protection blocks is used to form the digital descriptor, and wherein the selection is determined using a skipping scheme in which after a first number of protection blocks, a second number of the protection blocks are skipped.

12. A method for integrity protecting data, comprising:
receiving as input data any new digital information from one or more sources;
forming a protection block representing the input data received during a first period of time, if any;
forming a digital descriptor using a plurality of protection blocks comprising at least the protection block, wherein respective ones of the plurality of protection blocks represent different periods of time; and
producing a delay-coding verification code based on the digital descriptor and a previous verification code.

13. The method of claim 12, wherein the input data comprises a gradually growing file.

14. The method of claim 12, wherein the forming of the protection block comprises combining data received from one or more sources during the first period of time into a single data unit.

15. The method of claim 12, wherein the digital descriptor is formed using the protection block and a time stamp.

16. The method of claim 12, wherein the forming of the digital descriptor comprises using one or more other digital descriptors.

17. The method of claim 12, wherein the digital descriptor comprises a message digest.

18. The method of claim 12, wherein the delay-coding verification code is formed using a memory-bound function.

19. The method of claim 12, wherein the delay-coding verification code is formed using a first function for a first protection block and using a second function for a second block.

20. A non-transitory computer readable medium having stored thereon a set of computer readable instructions that, when executed by at least one processor, cause an apparatus to perform at least:
receive as input data any new digital information from one or more sources;
form a protection block representing the input data received during a first period of time, if any;
form a digital descriptor using a plurality of protection blocks comprising at least the protection block, wherein respective ones of the plurality of protection blocks represent different periods of time; and
produce a delay-coding verification code based on the digital descriptor and a previous verification code.

* * * * *